United States Patent Office 3,481,879
Patented Dec. 2, 1969

3,481,879
PRODUCTS FOR CLEANING STONE, BRICKS, CONCRETE AND OTHER CONSTRUCTIONAL MATERIALS
Georges Salomone, Paris, France, assignor to Societe SEFA, Paris, France
No Drawing. Filed Apr. 18, 1966, Ser. No. 543,024
Claims priority, application France, Oct. 22, 1965, 35,968
Int. Cl. C11d 1/82, 7/02
U.S. Cl. 252—136                                    1 Claim

ABSTRACT OF THE DISCLOSURE

A composition for cleaning constructional material such as stone, bricks and concrete, constituted by a pasty mixture consisting essentially of water, ammonium difluoride, barium chloride, magnesium fluosilicate, zinc fluosilicate, hydrofluoric acid, sodium silicate and pulverulent sugar.

---

My invention has for its object a novel product for cleaning stone, bricks, concrete and other constructional material, said product appearing as a paste adapted to be applied immediately by means of a brush on the surface to be cleaned, which surface is then scrubbed and finally rinsed with water.

My improved product is constituted by an aqueous paste having as a base ammonium difluoride, barium chloride, magnesium fluosilicate, zinc fluosilicate, hydrofluoric acid and sodium fluosilicate with a stabilizing sugar.

By way of a preferred example, providing optimum results, the following composition may be proposed for the paste:

| | | |
|---|---|---|
| Water | litres | 180 |
| Ammonium difluoride | kgs | 50 |
| Barium chloride | kgs | 82 |
| Magnesium fluosilicate | kgs | 7 |
| Zinc fluosilicate | kgs | 7 |
| Hydrofluoric acid | kgs | 30 |
| Sodium fluosilicate | kgs | 50 |
| Pulverulent sugar | kgs | 100 |

The mixture is prepared in a container which cannot be attacked by said components, such as a vat of polyvinyl chloride inside which the mixture is intimately mixed by a stirring apparatus during one and a half hours at 30° C. The white paste obtained is applied for use by means of a brush over the surface to be cleaned after which said surface is cleaned with a brush having yielding brass bristles and is finally rinsed with water.

What I claim is:
1. A composition for cleaning constructional material such as stone, bricks and concrete, constituted by a pasty mixture consisting essentially of the following materials in their respective proportions:

| | | |
|---|---|---|
| Water | litres | 180 |
| Ammonium difluoride | kgs | 50 |
| Barium chloride | kgs | 82 |
| Magnesium fluosilicate | kgs | 7 |
| Zinc fluosilicate | kgs | 7 |
| Hydrofluoric acid | kgs | 30 |
| Sodium fluosilicate | kgs | 50 |
| Pulverulent sugar | kgs | 100 |

References Cited

UNITED STATES PATENTS

| | | | |
|---|---|---|---|
| 208,441 | 9/1878 | Varns | 252—142 |
| 2,257,467 | 9/1941 | Jacobson | 252—145 |
| 3,150,007 | 9/1964 | Kovachy | 252—145 |

OTHER REFERENCES

F. M. Lea and C. H. Desch: The Chemistry of Cement and Concrete, 1956, pages 522, 587.

HERBERT B. GUYNN, Primary Examiner
D. L. ALBRECHT, Assistant Examiner

U.S. Cl. X.R.
252—137, 142; 134—28